July 7, 1942.  L. SCHWITZER  2,288,849
POWER DRIVE FOR STOKERS
Filed Jan. 12, 1940   2 Sheets-Sheet 1
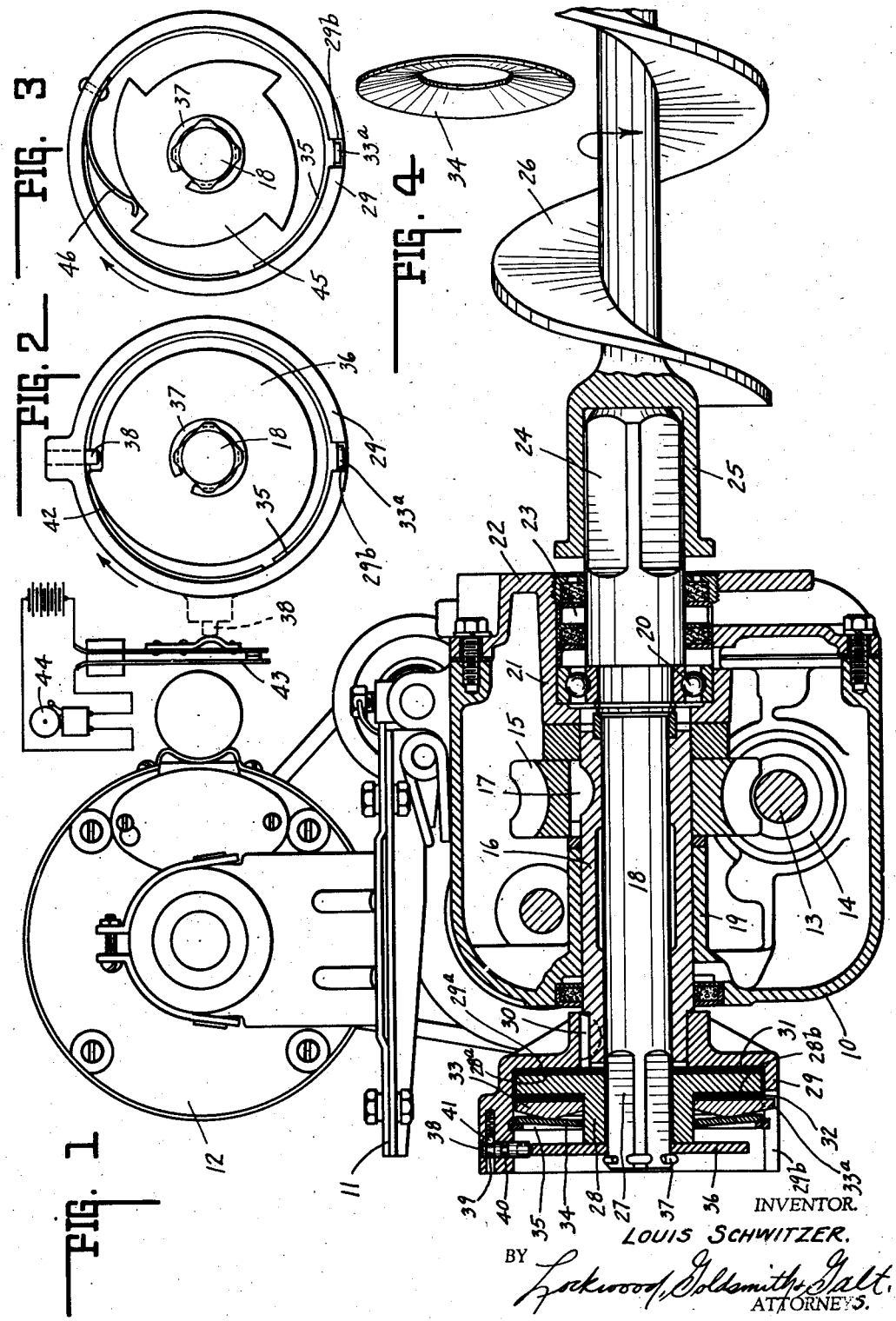
INVENTOR.
LOUIS SCHWITZER.
BY Lockwood, Goldsmith & Galt
ATTORNEYS.

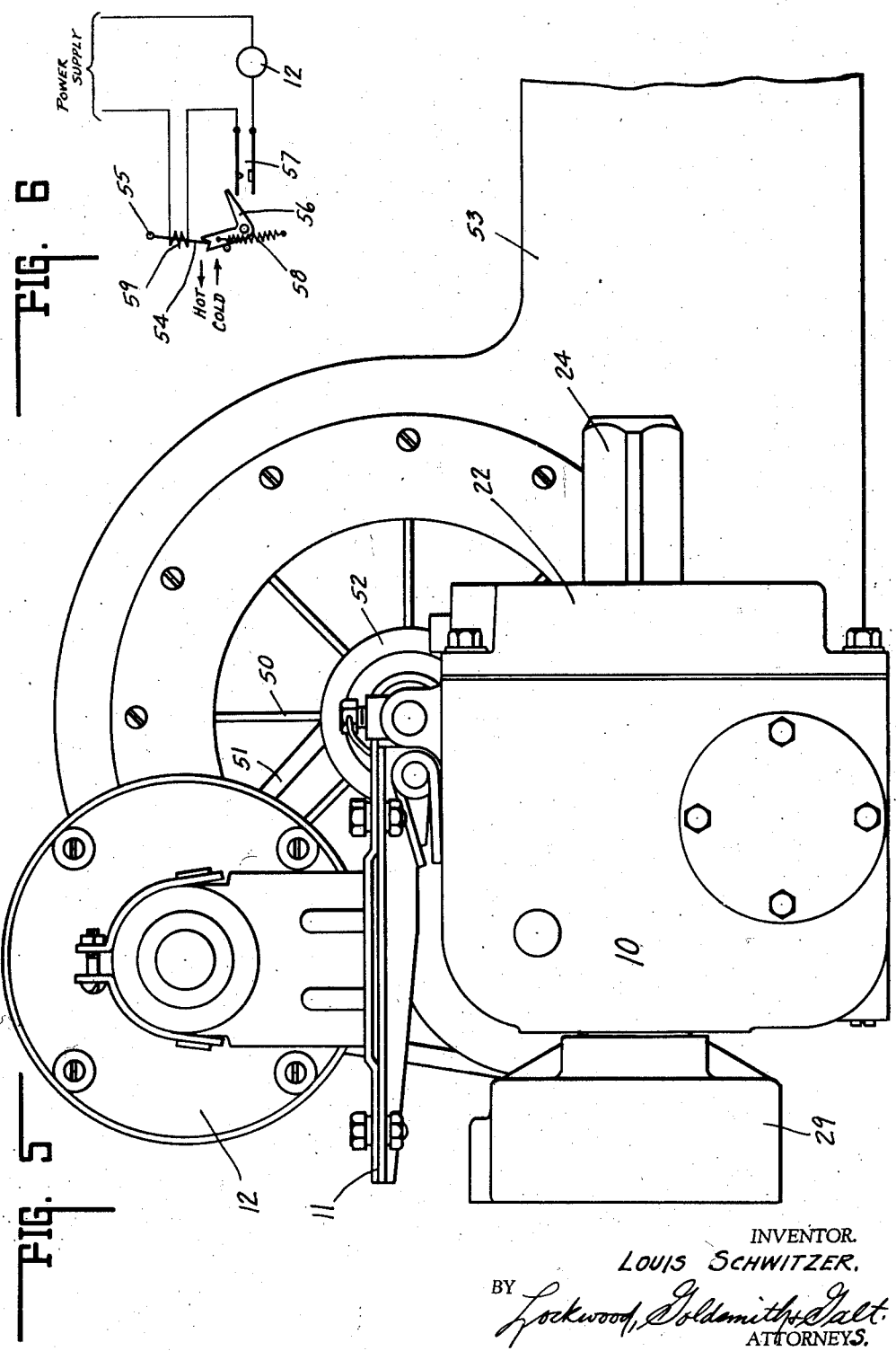

Patented July 7, 1942

2,288,849

UNITED STATES PATENT OFFICE 2,288,849

POWER DRIVE FOR STOKERS

Louis Schwitzer, Indianapolis, Ind., assignor to Schwitzer-Cummins Company, Indianapolis, Ind., a corporation Application January 12, 1940, Serial No. 313,481

4 Claims. (Cl. 110—32)

This invention relates to a power drive for stokers. In the drive of stokers it has been common practice to place in the drive at some point a shear pin or key which breaks when an overload due to a mechanical stoppage occurs. By this means the motor and other parts are relieved of the load. Thereafter it is necessary to shut down the motor, clear the obstruction and substitute a new shear pin before normal operation can be resumed. After the shear pin breaks the motor may run idle for some time before the breakage is discovered since the first indication usually is the fact that the fire goes out for lack of fuel. The motor usually also drives a fan or blower furnishing air for combustion. During the time in which the motor is running with a broken shear pin the fan continues to supply air so that the fuel remaining in the retort is rapidly consumed and the fire remains for only a relatively short time after the shear pin breaks.

One object of the invention is to provide simple mechanical overload protection without the use of a shear pin.

Another object of the invention is to provide a drive in which the motor, although protected against overload, may continue to exert a torque on the driven member after said member has been stopped by an obstruction. By this means an obstruction, such as a particularly large lump of coal, may be automatically broken and cleared by the continued action of the motor on the conveyor screw without necessitating any shut down of the apparatus.

Another object of the invention is to provide means by which the torque exerted by the motor in attempting to clear the obstruction is intermittent rather than continuous. During the time when the conveyor screw is stopped by an obstruction the motor is alternately stopped and started and it is found that the repeated starting of the motor provides a shock action which is more effective in clearing an obstruction than is a torque continuously applied.

Another object of the invention is to provide for intermittent operation of the fan during periods of stoppage instead of continuous operation as heretofore. Such intermittent operation insures that the fuel burns more slowly and the fire lasts much longer even though the operation of the motor fails to clear the stoppage.

Another object of the invention is to provide means by which an alarm is given whenever the driven member is stopped by an obstruction. In most cases the alarm may be such as to produce an audible signal localized at the stoker itself. In other cases a remote alarm device may be provided and operated electrically from the stoker.

These objects are attained by providing between the motor and the feed screw a drive connection of the friction clutch type adapted to slip when the screw is stopped by an obstruction. The usual thermally operated overload protection is provided for the motor and the friction drive is so adjusted that when slippage occurs the torque transmitted is sufficient to operate the thermal cut out after the usual time delay necessary to heat the thermal element. The motor continues to operate and to exert a torque on the feed screw until the thermal element heats up whereupon the motor stops until the thermal element cools to a predetermined degree and again cuts in the motor. Thus the operation of the motor and the fan driven thereby is intermittent as long as the stoppage endures. The range between cut-in and cut-out temperatures of the thermal element may be adjusted to provide suitable periods of fan operation to hold the fire as long as fuel remains in the retort but to prevent too rapid combustion. The intermittent operation of the motor is much better adapted for clearing an obstruction than continuous operation would be. If the obstruction is automatically cleared, normal operation is resumed at once without attention of the operator.

To provide an alarm device, advantage is taken of the fact that certain parts of the apparatus have relative movement with respect to each other only when a stoppage has occurred. The alarm is preferably of an audible type and may consist merely in a series of clicks caused by relatively moving parts of the drive mechanism. More elaborate alarms electrically operated at a distance may be provided and may be audible or visual, as desired.

Other objects and features of the invention will be understood from the accompanying drawings and the following description and claims:

Fig. 1 is a vertical sectional view through a stoker drive constructed in accordance with the invention. Fig. 2 is an end view of a portion thereof showing means associated therewith for operating a remotely positioned alarm device. Fig. 3 is a similar view of an alternative form for sounding a localized alarm. Fig. 4 is a perspective view of one member separated from the assembly. Fig. 5 is an elevational view of a stoker drive assembly including the fan or blower for supplying air for combustion. Fig. 6 is a wiring diagram of electrical connections.

In the preferred form of the invention shown in the drawings by way of illustration, there is provided a gear housing 10 carrying a platform 11 on which there is mounted a motor 12. Through a suitable driving connection, not shown, the motor rotates a worm shaft 13. Said shaft is provided with a worm 14 meshing with a worm wheel 15 which is secured to a driving sleeve 16 by means of a key 17. The sleeve 16 has journalled therein a driven shaft 18 and is itself journalled in a bearing 19 formed on the housing 10. The driven shaft 18 is also mounted on a ball bearing construction 20 adapted to take both radial and thrust loads. The ball bearing construction is seated in an inward extension 21 of the cap 22 of the housing 10 and said extension also houses the usual oil, water and dust seals 23. The inner end of the driven shaft 18 is squared as shown at 24 and receives the socket 25 of a feed screw 26 adapted to feed fuel to the retort of the stoker through the usual fuel conduit, not shown. The motor 12 also drives a blower 50 (Fig. 5) by means of a belt 51 and pulley 52. Said blower supplies air for combustion to the retort of the stoker by means of an air conduit 53.

The motor 12 is provided with electrical overload protection preferably of the thermal type, one form of which is shown diagrammatically in Fig. 6. In this form of protective device a bimetal strip 54 is anchored at 55 and the free end thereof moves in the direction of the arrows indicated "Hot" and "Cold" as the strip is heated or cooled. A switch operating member 56 is moved by the bimetal strip 54 to open a switch 57 when the strip moves in the "hot" direction to a predetermined point and to close said switch when the strip moves to a predetermined point in the "cold" direction. An overcenter spring diagrammatically shown at 58 moves the switch operating member with a snap action when said points are reached. The strip 54 is heated by a heating coil 59 carrying the line current of the motor 12. The switch 57 is connected in the circuit of the motor as shown or may be connected in an auxiliary circuit controlling the motor in any well known manner. The overload device just described functions to stop the motor when the line current drawn thereby exceeds a certain amount for a certain length of time, dependent upon the radiating capacity of the device. After the motor has been stopped for a period of time, the strip 54 cools and operates the switch 57 to start the motor. The representation of the overload device in Fig. 6 is purely diagrammatic. Many well known devices performing the same function are commercially available and any of them may be used in the invention.

The outer end of the shaft 18 is squared as shown at 27 and carries a clutch plate 28 having a suitable squared opening for transmitting torque to the shaft. Said clutch plate, however, is movable longitudinally along the shaft. A housing 29 surrounds the plate 28 and is secured to the outer end of the driving sleeve 16 by means of a key 30. The clutch plate 28 and housing 29 are provided with opposed parallel faces 28a and 29a respectively and between said faces there is interposed a friction disc 31 which may be formed of any of the well known materials used for brake linings or clutch facings. The disc 31 may be secured to either of the faces 28a or 29a or may float freely between the same. A similar friction disc 32 is similarly interposed between the opposite face 28b of the clutch plate 28 and an annular pressure plate 33. The pressure plate 33 is provided with a lug 33a engaging a slot 29b in the housing 29 and constraining said plate to rotate with said housing.

The outer face of the plate 33 is humped as best seen in Fig. 1. A disc spring 34 engages the hump of the plate 33 and is held in place by a snap ring 35 seated in a groove in the housing 29. The spring disc 34 in its free condition is dished inwardly as shown in Fig. 4 so that when held in place against the plate 33 by the snap ring 35 said disc reacts against the snap ring 35 and housing 29 to exert an inward pressure on the plate 33 which clamps together the friction disc 32, the clutch plate 28, the friction disc 31 and the housing 29.

By means of the apparatus just described, the motor 12 normally drives the shaft 18 and feed screw 26 through the friction connection between housing 29 and plate 28. In the normal operation, the line current drawn by the motor is insufficient to heat the thermal control device to the point at which the motor will be stopped. When the screw 26 encounters an obstruction sufficient to cause a stoppage, the friction driving elements slip, the clutch plate 28 remaining stationary and the housing 29 continuing to rotate. The pressure of spring 34 is so adjusted that the stationary parts exert a frictional drag on the moving parts which causes the motor to draw sufficient line current to trip the thermal cut out switch 57 after a brief period of operation. After a succeeding period of idleness, the bimetal strip 54 cools sufficiently to restart the motor. Thus the motor operates intermittently as long as the stoppage continues and while operating exerts a frictional torque on the shaft 18 and feed screw 26 which tends to clear the obstruction. Each time the motor is started, the torque is suddenly applied with a resulting shock which is very effective in clearing a stoppage caused by a particularly large lump of coal or other frangible body. If the obstruction is successfully cleared in this manner, normal operation is immediately resumed. If not, the intermittent motor operation continues until the stoker is shut down and the obstruction is manually cleared.

Throughout the duration of a stoppage the blower 50 operates only during the intermittent periods of motor operation. If the fan operated continuously the fuel in the retort would be rapidly consumed and the fire would go out in a relatively short time. The intermittent fan operation insures a much slower rate of combustion and preserves the fire for a much longer period. By proper choice of the characteristics of the thermal overload device and proper adjustments, the periods of fan operation may be made similar to those ordinarily used for hold-fire operation in the normal use of the stoker. By this means the fire may be preserved throughout a relatively long stoppage.

A means for sounding a distinct alarm when an obstruction occurs is shown in Figs. 1 and 2 and includes a cam disc 36 mounted on the shaft 18 and having a squared central hole fitting said shaft. Said disc is held in place on the shaft by a snap ring 37. In the housing 29 there is mounted a pin 38 which is rotatable with the housing but is free to move radially with respect thereto. Said pin is provided with a pair of grooves 39 and 40 which are engageable by a spring-pressed ball 41 within the housing to retain the pin either in the normal inner position shown in Fig. 1 or in an outer position, shown by dotted lines in Fig. 2, in which it projects beyond the wall of said housing. In its normal path of rotation the pin 38 extends within the housing 29 sufficiently far to be engaged by a cam surface 42 formed on the periphery of the cam disc 36. However, the cam disc and housing normally rotate together at the same speed and are normally so placed in starting the machine that the pin 38 may remain in its normal inner position. Whenever a stoppage of the screw 26 occurs, however, the cam disc 36 which normally rotates with the screw is stopped while the housing 29 and pin 38 continue to rotate in the direction of the arrow in Fig. 2. A single rotation of the housing 29 causes the pin 38 to engage the cam surface 42 and to be moved outwardly beyond the surface of the housing. In this new path of rotation the pin may engage an electric switch 43 which is connected in circuit with an alarm bell 44 and which operates said bell once for each revolution of the housing 29. Obviously, other forms of electrically operated alarm devices than the bell 44 may be used. An example is an electric light which, when connected in the circuit in the same manner, gives a flashing signal as long as a stoppage endures and the motor is running.

In Fig. 3 there is shown an alternative form of construction in which a local alarm only is sounded. In this construction a toothed member 45 is substituted for the cam disc 36 and is secured to the shaft 18 by the snap ring 37 in the same manner. A resilient finger 46 is secured to the inner surface of the housing 29 and engages the periphery of the toothed member 45. So long as the stoker is operated normally there is no relative movement between the toothed member and the finger 46. When stoppage of the screw 26 occurs, the toothed member 45 also stops but the housing 29 continues to carry the resilient member 46 in the direction of the arrow in Fig. 3. Each time that the finger 46 passes one of the teeth of the member 45 it snaps inwardly and produces an audible click which may serve as an alarm. If the stoppage is automatically cleared by the continued pressure of the motor, normal operation is resumed and the alarm device ceases to operate.

The foregoing specification describes the invention in its present preferred form, the details of which may be varied without departing from the scope of the invention as defined by the appended claims.

The invention claimed is:

1. In a power drive for stokers, a driving member, a driven member, a frictional drive connection between said members adapted to permit relative movement between said members when abnormal resistance is encountered by said driven member, a motor operating said driving member, and a thermal cut-out device controlling operation of said motor and adapted to stop and start said motor alternately when electric current drawn thereby is greater than a predetermined amount, said frictional drive connection being adjusted to permit continued rotation of said motor when said driven member is stopped by an obstruction and the current drawn by said motor during such continued rotation actuating said thermal cutout device.

2. In a power drive for stokers, a fuel feeding member, an electric motor, driving connections between said member and said motor, said connections including a friction driving unit adapted to slip and permit continued operation of said motor when said fuel feeding member is stopped by an obstruction and adjusted to exert a predetermined retarding torque on said motor when such slippage takes place, and a thermal cut out unit connected to control operation of said motor and responsive to heating effect of the load current drawn by said motor, said unit being adapted to stop said motor when said clutch has slipped for a period of time and a current corresponding to said predetermined torque has been drawn during said period and said thermal cutout unit being adapted to start said motor after a succeeding period of idleness.

3. In a stoker construction, a fuel feeding member, a blower for supplying air for combustion, a motor, a driving connection between said motor and blower, a frictional driving connection between said motor and fuel feeding member, said frictional connection being adapted to slip and permit operation of the motor when said fuel feeding member is stopped by an obstruction and adjusted to exert a predetermined retarding torque on said motor when such slippage takes place, and a motor control unit responsive to the load carried by said motor and adapted alternately to stop and start said motor when said predetermined torque is exerted thereon, whereby said blower is intermittently operated during a period of stoppage.

4. In a stoker construction, a fuel feeding member, a blower for supplying air for combustion, a motor, a driving connection between said motor and blower, a frictional driving connection between said motor and fuel feeding member, said frictional connection being adapted to slip and permit operation of the motor when said fuel feeding member is stopped by an obstruction and adjusted to exert a predetermined retarding torque on said motor when such slippage takes place, and a thermal cutout unit connected to control operation of said motor and responsive to heating effect of the load current drawn by said motor, said unit being adapted to stop said motor when a current corresponding to said predetermined torque has been drawn for a period of time and to start said motor after a succeeding period of idleness, whereby said blower is intermittently operated during a period of stoppage.

LOUIS SCHWITZER.